(12) United States Patent
Raanani et al.

(10) Patent No.: US 10,051,122 B2
(45) Date of Patent: Aug. 14, 2018

(54) MODELING VOICE CALLS TO IMPROVE AN OUTCOME OF A CALL BETWEEN A REPRESENTATIVE AND A CUSTOMER

(71) Applicant: AffectLayer, Inc., San Francisco, CA (US)

(72) Inventors: Roy Raanani, Rheinfelden (CH); Russell Levy, Raanana (IL); Micha Yochanan Breakstone, Raanana (IL)

(73) Assignee: AffectLayer, Inc., Tel Aviv-Jaffa (IL)

( * ) Notice: Subject to any disclaimer, the term of this patent is extended or adjusted under 35 U.S.C. 154(b) by 163 days.

(21) Appl. No.: 15/168,675

(22) Filed: May 31, 2016

(65) Prior Publication Data

US 2016/0352902 A1 Dec. 1, 2016

Related U.S. Application Data

(60) Provisional application No. 62/169,456, filed on Jun. 1, 2015, provisional application No. 62/169,445, filed on Jun. 1, 2015.

(51) Int. Cl.
| | |
|---|---|
| *H04M 3/00* | (2006.01) |
| *H04M 5/00* | (2006.01) |
| *H04M 3/51* | (2006.01) |
| *G06N 99/00* | (2010.01) |
| *G06N 7/00* | (2006.01) |
| *G06F 17/27* | (2006.01) |

(Continued)

(52) U.S. Cl.
CPC ...... *H04M 3/5175* (2013.01); *G06F 17/2785* (2013.01); *G06F 17/289* (2013.01); *G06N 7/005* (2013.01); *G06N 99/005* (2013.01); *H04M 3/5232* (2013.01); *G10L 17/02* (2013.01); *G10L 17/26* (2013.01); *G10L 25/51* (2013.01); *G10L 25/63* (2013.01); *H04M 3/42221* (2013.01); *H04M 2201/40* (2013.01); *H04M 2203/357* (2013.01); *H04M 2203/556* (2013.01)

(58) Field of Classification Search
CPC .......... H04M 3/42221; H04M 3/5232; H04M 2203/556; H04M 2203/551; H04M 3/5191
USPC .............. 379/265.07, 265.05, 265.06, 266.1, 379/265.03
See application file for complete search history.

(56) References Cited

U.S. PATENT DOCUMENTS

| | | |
|---|---|---|
| 7,023,979 B1 | 4/2006 | Wu et al. |
| 7,487,094 B1 | 2/2009 | Konig et al. |

(Continued)

OTHER PUBLICATIONS

Non-Final Office Action dated Nov. 16, 2017 of U.S. Appl. No. 15/460,931 by Raanani, R., et al., filed Mar. 16, 2017.

(Continued)

*Primary Examiner* — Thjuan K Addy
(74) *Attorney, Agent, or Firm* — Perkins Coie LLP (57) ABSTRACT

A call-modeling system models calls in real-time, with the goal of helping users, e.g., a sales representative and/or their managers, improve and/or guide the outcome of the calls. The call-modeling system generates real-time probabilities for possible outcomes of the conversation, as well as highlight specific on-call patterns, which may be either conducive or detrimental to a desired conversation outcome. The generated probabilities and highlighted patterns may be used by the sales representatives and/or their managers to either increase the probability of a desired outcome and/or optimize for call duration with a specific outcome.

41 Claims, 7 Drawing Sheets

(51) Int. Cl.
*G06F 17/28* (2006.01)
*H04M 3/523* (2006.01)
*G10L 17/02* (2013.01)
*H04M 3/42* (2006.01)
*G10L 25/51* (2013.01)
*G10L 25/63* (2013.01)
*G10L 17/26* (2013.01)

(56) References Cited

U.S. PATENT DOCUMENTS

| | | | |
|---|---|---|---|
| 8,914,285 B2 | 12/2014 | Pollak et al. | |
| 9,635,178 B2 | 4/2017 | Raanani et al. | |
| 2004/0098274 A1 | 5/2004 | Dezonno et al. | |
| 2007/0038499 A1 | 2/2007 | Margulies et al. | |
| 2009/0222313 A1 | 9/2009 | Kannan et al. | |
| 2012/0072254 A1 | 3/2012 | McLean et al. | |
| 2014/0025376 A1 | 1/2014 | Wasserblat et al. | |
| 2014/0086402 A1 | 3/2014 | Kan et al. | |
| 2014/0270133 A1 | 9/2014 | Conway et al. | |
| 2014/0317030 A1* | 10/2014 | Shen ..................... | G06N 3/006 706/12 |
| 2015/0201077 A1 | 7/2015 | Konig et al. | |
| 2015/0237213 A1 | 8/2015 | Spottiswoode et al. | |
| 2015/0242860 A1 | 8/2015 | Kannan et al. | |
| 2015/0254675 A1 | 9/2015 | Kannan et al. | |
| 2015/0256675 A1* | 9/2015 | Sri ..................... | H04M 3/5183 379/265.09 |
| 2015/0348570 A1 | 12/2015 | Feast et al. | |
| 2016/0225372 A1* | 8/2016 | Cheung ................. | G10L 15/22 |
| 2016/0352907 A1 | 12/2016 | Levy et al. | |
| 2017/0187880 A1 | 6/2017 | Raanani et al. | |

OTHER PUBLICATIONS

Notice of Allowance dated Feb. 14, 2017 of U.S. Appl. No. 15/168,729 of Raanani, R., et al., filed May 31, 2016.

Corrected Notice of Allowability dated Mar. 21, 2017 of U.S. Appl. No. 15/168,729 of Raanani, R., et al., filed May 31, 2016.

Co-Pending U.S. Appl. No. 15/168,729 of Raanani, R., et al., filed May 31, 2016.

Non-Final Office Action dated Oct. 20, 2016 of U.S. Appl. No. 15/168,729 of Raanani, R., et al., filed May 31, 2016.

Notice of Allowance dated Dec. 19, 2017 of U.S. Appl. No. 15/460,931 by Raanani, R., et al., filed Mar. 16, 2017.

* cited by examiner

MODELING VOICE CALLS TO IMPROVE AN OUTCOME OF A CALL BETWEEN A REPRESENTATIVE AND A CUSTOMER

CROSS-REFERENCE TO RELATED APPLICATION(S)

This application claims the benefit of U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, and U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, both of which are incorporated herein by reference for all purposes in their entirety.

BACKGROUND

With over 2.4 million non-retail inside sales representatives in the United States (U.S.) alone, millions of sales phone conversations are made on a daily basis.[i] However, except for rudimentary statistics concerning e.g., call length and spotted keywords and phrases, sales conversations are left largely unanalyzed, rendering their content inaccessible to modeling, and precluding the ability to optimize them for desired outcomes. Recent advances in automatic speech recognition (ASR) technologies, and specifically in large vocabulary continuous speech recognition (LVCSR), are for the first time enabling high-accuracy automatic transcription of conversations. At the same time, natural language processing (NLP) approaches to both topic modeling and world-knowledge modeling, have become much more efficient due to the availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners.

[i]Insidesales.com "Market size 2013" study

DETAILED DESCRIPTION

Embodiments are disclosed for a call-modeling system for modeling conversations, e.g., voice conversations, in real time, with the goal of helping users, e.g., sales representatives and/or their managers, to improve and/or guide the outcome of conversations with other users, e.g., customers. One such embodiment can model the calls based on characteristics of the conversation, e.g., voice of the representatives and/or the customers, and content of the conversation, with the goal of positively influencing the outcome of the call. The call-modeling system can generate real-time probabilities for possible outcomes of a real-time conversation, e.g., an ongoing conversation between a specific representative and a customer, and generate specific on-call guidance, which may be either conducive or detrimental to a desired conversation outcome. The generated probabilities and on-call guidance may be used by the representatives and/or their managers to either increase the probability of a desired outcome and/or optimize the conversation for a specified duration if the predicted outcome is not going to be a desired outcome. For example, for renewing a magazine subscription, the call-modeling system can generate an on-call guidance suggesting a representative to engage in a rapport building exercise with the customer if it is determined that doing so increases the chances of the customer renewing the membership by 45%. On the other hand, if the call-modeling system predicts from the on-going conversation that the customer is not going to renew the subscription membership, then the call-modeling system can suggest the representative to wrap up the conversation as soon as possible.

The call-modeling system can include (i) an offline analysis component and (ii) a real-time analysis component. The offline analysis component can take as input conversations between a calling party, e.g., a customer, and a called party, e.g., a representative, and process the conversations using multiple distinct components to generate multiple features of the conversations. In some embodiments, the conversations can be audio recordings of calls between called party and the calling party (collectively referred to as "participants"). The features can include transcripts of audio recordings, vocabulary, semantic information of conversations, summarizations of utterances and various natural language entailments, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), personal attributes (e.g., an age, an accent, and a gender), customer-representative pair attributes that indicate specific attributes associated with both the speakers that contribute to a specified outcome (e.g., similarity of speech rate between the representative and the user, extrovert/introvert matching, or gender or age agreement).

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", or "follow-up call scheduled"), and/or a tag that indicates "key moments" of a conversation. A "key moment" or a "moment" can be a specific event or an occurrence of a specified characteristic in the call. The moment can be any event or occurrence that is of specific interest for a specified application for which the call-modeling system is being implemented. An administrator of the call-modeling system can configure what events and/or occurrences in a call have to be identified as a moment. For example, a moment can include laughter, engagement, fast-talking, open-ended questions, objections, etc. in a conversation. The tags can be generated automatically by the call-modeling system, manually, e.g., by human judgment, or both. In some embodiments, the tags are generated automatically by the call-modeling system. The tag can include various details, e.g., information regarding a moment, a time interval at which the moment occurred in the call, duration for which the moment lasted, information regarding the participants of the call, etc.

The moments can also be notified to and/or shared between the participants during an on-going conversation and/or after the conversation. For example, during a call between a user and a representative, the call-modeling system can analyze the call, identify the moments in the conversation, and tag, notify and/or share the moments with the representative's manager, peers or other people. The shared moments can be used for various purposes, e.g., for coaching the representatives in handling the calls to improve outcomes of the calls based on various situations. The moments can be shared using various means, e.g., via email, a chat application, or a file sharing application.

In some embodiments, the offline analysis component uses distinct components to extract the features. The components can include an automatic speech recognition (ASR) component, which can produce a transcription of the conversation, a natural language processing (NLP) component, which can extract semantic information (such as open-ended questions asked, key objections, etc.) from the conversation, an affect component, which can analyze the recording for emotional signals and personality traits (e.g., likeability and trustworthiness), and a metadata component, which can extract data regarding conversation flow (i.e., who spoke when, and how much silence and overlap occurred).

The offline analysis component can analyze the features to generate one or more classifiers that indicate conversation outcomes, e.g., "sales closed", "sales failed." Each of the classifiers indicates a specific outcome and can include a set of features that contribute to the specific outcome. The offline analysis component can generate multiple classifiers for the same outcome; however, the multiple classifiers can have distinct sets of features. In some embodiments, the offline analysis component can analyze the features using a machine learning algorithm (e.g., a linear classifier, such as a support vector machine (SVM), or a non-linear algorithm, such as a deep neural network (DNN) or one of its variants) to generate the classifiers.

In some embodiments, the offline analysis component generates a classifier for different time intervals or time windows of the conversations. For example, the offline analysis component can analyze the extracted features for seconds 00:05-00:10 of a conversation, seconds 00:20-00:30, and minutes 1:00-2:00, and generate a classifier for each of those time windows. The offline analysis component feeds the extracted features into the machine-learning algorithm to produce multiple classifiers corresponding to the time windows. The time windows can be of varying lengths or fixed lengths. In some embodiments, the offline analysis component can generate classifiers for other relative positions of a conversation. For example, the offline analysis component can generate a classifier corresponding to an instance in the conversation, e.g., when a customer spoke for the first time in the conversation, and analyze features such as a pitch of the voice, a topic the customer spoke about first, and the length of the customer's first talk, to generate the classifier.

The real-time analysis component uses the classifiers to model a real-time conversation, e.g., an ongoing call between a representative and a customer, that helps the representative to increase a probability of a desired outcome of the conversation or optimize the conversation duration in case the real-time analysis component does not predict the desired outcome. The real time analysis component receives real-time call data of an ongoing conversation between the customer and a representative and analyzes the real-time call data to generate a set of features, e.g., using the offline analysis component as described above. The real-time analysis component can then feed the features to the classifiers to generate probabilities of potential outcomes of the call. The real-time analysis component can use the classifiers with highest prediction powers to generate the probabilities of various potential outcomes. In some embodiments, the real-time analysis component measures the prediction powers of the classifiers using an F-score, which, in statistical analysis, is a (possibly weighted) harmonic mean of precision and recall.

The real-time analysis component feeds the extracted features into the classifiers with high F-scores to generate probabilities of possible outcomes. Based on the probabilities, the real-time analysis component can also generate on-call guidance, which encourages the representative and/or their managers to modify, desist or persist with a specified on-call behavior to increase or decrease the probability of one of the possible outcomes, e.g., a desired outcome such as closing a sale. In some embodiments, the on-call guidance includes a set of suggested features and their values to be adopted, desisted or persisted with by the representative. For example, the on-call guidance can include instructions for the representative to change the rate of speech (e.g., speak slower), use specific key words, or pose more open-ended questions to the customer.

In some embodiments, the on-call guidance can change as the call progresses, e.g., based on the classifiers that are relevant to the call at that particular time of the conversation. For example, during the first two minutes of the call, a classifier that corresponds to the first two minutes of the call may be used to generate the on-call guidance such as instructing the representative to pose open-ended questions to the customer, and then in the third minute, a classifier that corresponds to the third minute of the call may be used to revise the on-call guidance, e.g., suggest to the representative to adjust the speech rate to match with that of the customer.

Additionally, if according to the classifiers, the real-time analysis component predicts the conversation to fail, the on-call guidance may suggest to the representative to quickly wrap up the call in order to spare the representative's time. The on-call guidance of the real-time analysis module may be presented on-screen or via any other interface (e.g., voice instructions given through an ear piece) to the representative and/or the manager. The embodiments can produce real-time probabilities of various outcomes of the conversations, enabling live coaching that can help the representatives in improving the outcomes of the conversations in real-time.

Figure 1:
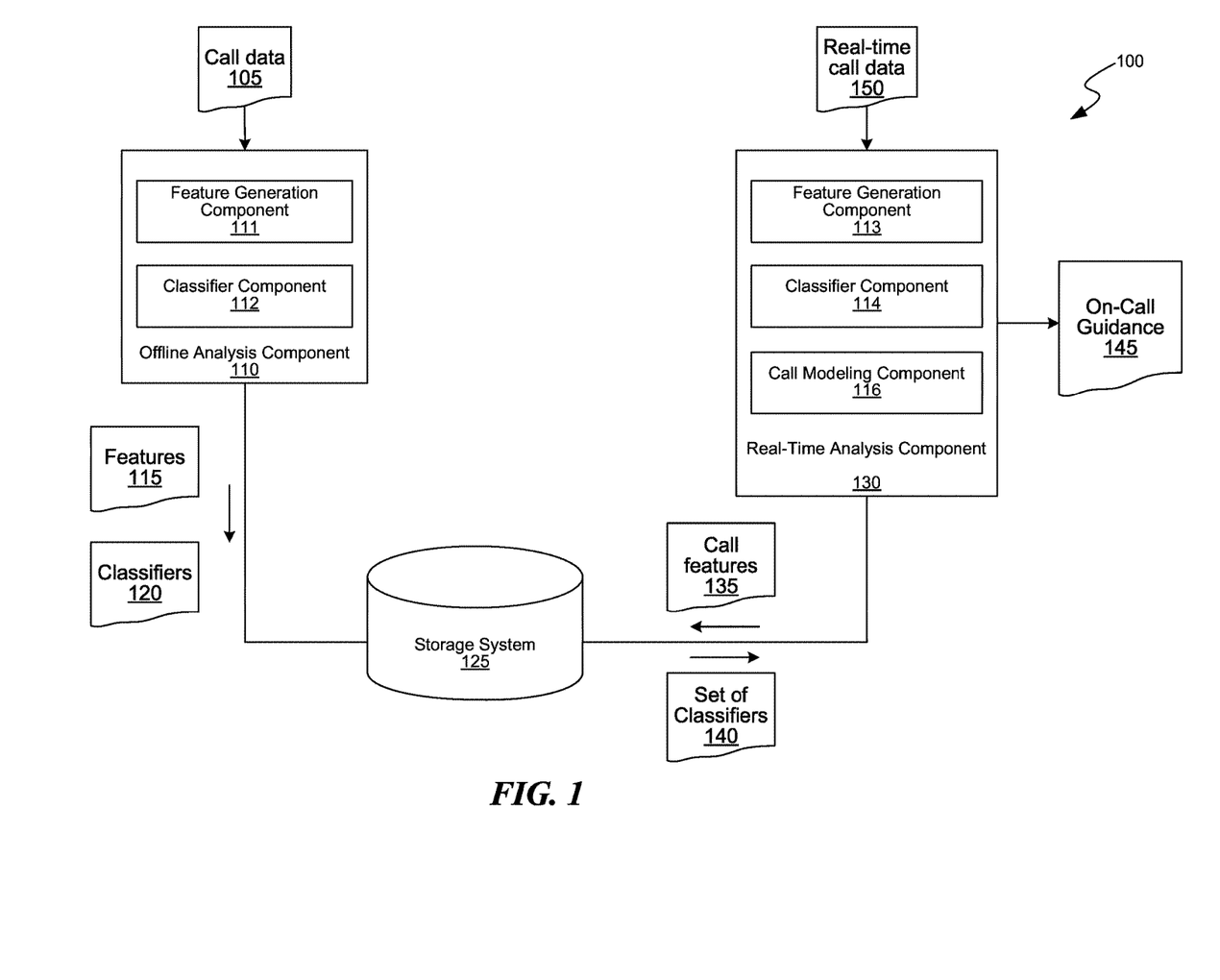
FIG. 1 is a block diagram of a call-modeling system in which the disclosed embodiments can be implemented.

Turning now to FIG. 1, FIG. 1 is a block diagram of a call-modeling system 100 in which the disclosed embodiments can be implemented. The call-modeling system 100 includes an offline analysis component 110 and a real-time analysis component 130. The offline analysis component 110 can take as input historical call data 105, which includes conversations between participants, e.g., audio recordings of calls between representatives and customers, and process the call data 105 using multiple components to generate features 115 of the conversations, and classifiers 120.

The offline analysis component 110 includes a feature generation component 111 that generates features 115 by analyzing the call data 105 using various techniques, e.g., ASR, NLP. The features 115 can include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), personality traits (e.g., trustworthiness, engagement, likeability, dominance, etc.), personal attributes (e.g., age, accent, and gender), and inter-speaker attributes that indicate a comparison between both the speakers (e.g., similarity of speech rate between the representative and the user, extrovert/introvert matching, or gender or age agreement).

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," a measure of "customer satisfaction," and Net Promoter Score (NPS). An outcome can have binary values, e.g., "yes/no", "high/low", or non-binary values, e.g., a probability score, enumerated values like "low, average, medium, high, very high," values on a scale of 0-10, etc. For example, an outcome such as customer satisfaction can be measured using binary values such as "low/high", or using non-binary values, such as a scale of 0-10, enumerated values. Each of the classifiers indicates a specific outcome, a probability of the specified outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal.

In some embodiments, the classifier component 112 generates different classifiers for different time windows of the conversations. For example, the classifier component 112 generates a classifier "C1" for the first two minutes of the conversations and a classifier "C2" for a third minute of the conversations. The classifier "C1" based on the first two minutes of the conversation can indicate that when laughter by a customer and two open-ended questions from the representative is registered, there is a high chance, e.g., 83%, of renewal. The classifier "C2" based on the third minute of the conversation can indicate that when a competitor magazine or the key-phrase "read online" is used, the renewal chances drop to 10%, all of which can occur if customer's speech rate drops below three words per second. Some of the classifiers include features for inter-speaker attributes that indicate a comparison between the speakers that contribute to a specified outcome (e.g., similarity of speech rate between the representative and the user, extrovert/introvert matching, or gender or age agreement).

Note that the features, when extracted from the conversations, are just attributes, i.e., without values, such as "gender", "age", "speech rate", etc., and the classifier determines what values of the features influence a particular outcome of the call. The classifiers 120 can be generated in various formats and is not limited to the above illustrated example format. The classifier component 112 can generate multiple classifiers for the same outcome; however, the multiple classifiers can have distinct sets of features. Further, as described above, the classifier component 112 can generate different classifiers for different time windows of the conversation. The offline analysis component 110 can store the features 115 and the classifiers 120 in a storage system 125.

The call-modeling system 100 includes a real-time analysis component 130 that uses the classifiers 120 to generate on-call guidance for both inbound and outbound calls that will help the representative optimize the call for a desired outcome, or optimize the call duration if the desired outcome is not predicted (i.e., very low chances of the desired outcome are predicted). The real-time analysis component 130 receives real-time call data 150 of an ongoing conversation between a customer and a representative and analyzes the real-time call data 150 to generate a set of features, e.g., call features 135, for the ongoing conversation using a feature generation component 113. In some embodiments, the feature generation component 113 is similar to or the same as the feature generation component 111. The feature generation component 113 generates the call features 135 based on the real-time call data 150, e.g., as described above with respect to the feature generation component 111. The real-time call data 150 can be an early-stage or initial conversation between the customer and the representative.

After the call features 135 are generated, a classifier component 114, which, in some embodiments, is the same as, or similar to the classifier component 112, inputs the call features 135 to the classifiers 120 to determine a set of classifiers 140 that predict possible outcomes of the call based on the call features 135. Each of the set of classifiers 140 indicates a specified outcome of the call and an associated probability of the corresponding outcome. In some embodiments, the classifier component 114 chooses classifiers that have the highest prediction power, which can be measured using an F-score, as the set of classifiers 140. After the set of classifiers 140 are determined, a call-modeling component 116 generates an on-call guidance 145 that includes real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and include those features and values associated with those features in the on-call guidance 145. The on-call guidance 145 notifies the representative to adopt, desist or persist with an on-call behavior consistent with those features to achieve the desired outcome, or to increase the probability of achieving the desired outcome. If the set of classifiers 140 predict that the desired outcome may not be achieved, the call-modeling component 116 may suggest, in the on-call guidance 145, that the representative wrap up the call.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can include an initial or early stage conversation, can be a conversation between the customer and an automated machine, e.g., an interactive voice response (IVR) system, or a representative for gathering preliminary information from the customer that can be useful for generating the on-call guidance.

In some embodiments, the call-modeling system 100 includes a search tool that empowers a user to explore various aspects of a conversation. For example, the search tool allows the user to search for anything that came up on the call, e.g., both linguistic and meta-linguistic. The search tool can be used to further analyze the conversation, extract appropriate features and use them to improve the classifiers in predicting the outcome of the calls. For example, the search tool can be used to find calls that registered a laughter from the customer, calls in which the customer spoke for the first time after a specified number of minutes, calls in which the customer sounded angry, calls in which customer mentioned competitors, calls in which the representatives engaged in rapport building, calls in which the representative modulated speech rates at various instances of the call, calls in which short or open-ended questions were asked at a high frequency, or any combination of the above.

Figure 2:
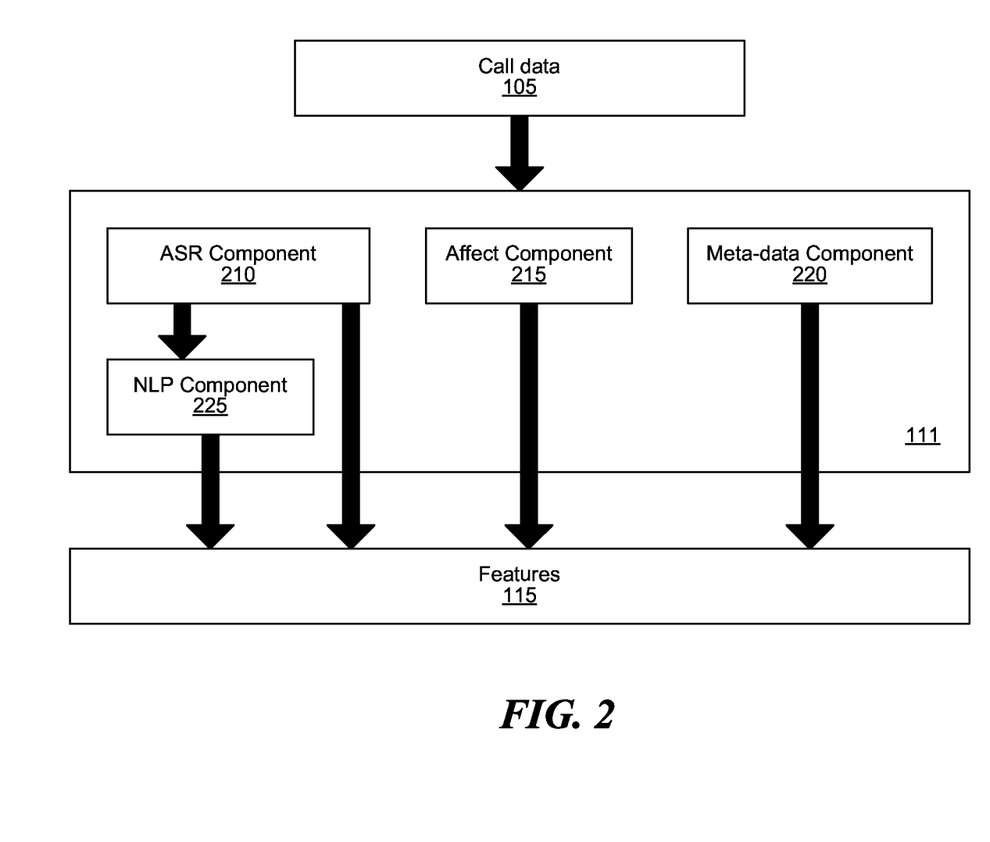
FIG. 2 is a block diagram of a feature generation component of the call-modeling system for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency-Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer, and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using salience heuristics such as TF-IDF), etc. Additional features that may be extracted by the NLP component 225 can be summarizations of utterances and various natural language entailments. The NLP features can be extracted separately for the representative and the customer, and may be recorded separately for multiple speakers on each side of the conversation.

The affect component 215 can extract low-level features and high-level features. The low-level features can refer to the voice signal itself and can include features such as speech rate, speech volume, tone, timber, range of pitch, as well as any statistical data over such features (e.g., maximal speech rate, mean volume, duration of speech over given pitch, standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, etc.) and perceived or absolute personal attributes such as age, accent, and gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level, which can be used in modeling outcomes. The affect features can be extracted separately for the representative and the customer, and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112.

Figure 3:
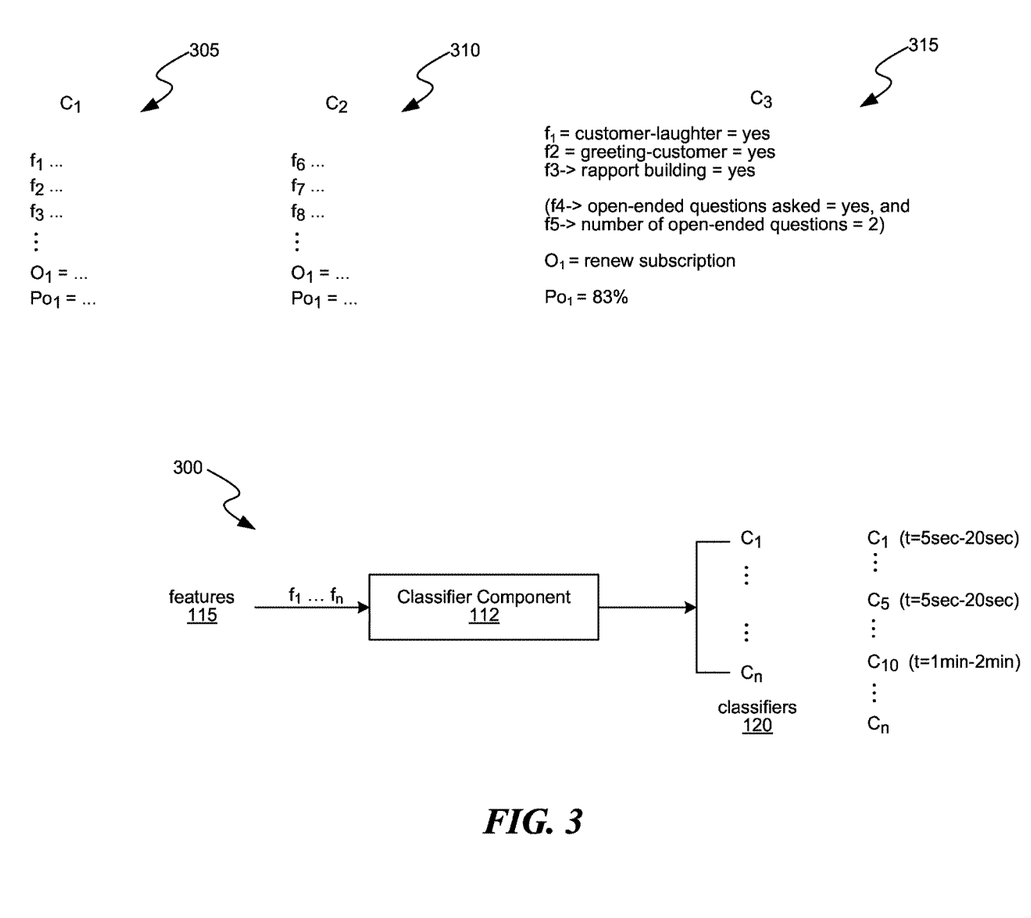
FIG. 3 is a block diagram of a classifier component of the call-modeling system for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to generate a number of classifiers, "C1"-"CN". In some embodiments, the classifier component 112 analyzes the features of a dedicated portion of the collected recordings, e.g., a training set, which is a subset of the entire recordings available for analysis, to generate the classifiers 120. Each of the classifiers 120 can have a value, e.g., an F-score, that indicates a prediction power of the classifier for the specified outcome. The higher the prediction power, the higher the probability of achieving the specified outcome of the classifier based on the included features. In some embodiments, the prediction power is determined by running the classifiers 120 on, e.g., a portion of call recordings that is not yet analyzed, e.g., a test set, and computing the respective F-score.

The classifiers 120 may be further analyzed to determine what features carry the largest prediction power, e.g., speech rate early in the conversation, occurrence of first interrupt by customer, names of competitors mentioned, or number of open questions thoughtfully answered, and a subset of these classifiers that have features with the largest prediction power can be used to generate the on-call guidance.

The conversation outcome depicted by the classifiers 120 can be any configurable outcome, e.g., "sales closed", "sales failed", "demo scheduled", "follow up requested," NPS-like probability of recommending to a friend, etc. In some embodiments, the features 115 extracted from the feature generation component 111 can be fed into a machine learning algorithm (e.g., a linear classifier, such as a SVM, or a non-linear algorithm, such as a DNN or one of its variants) to produce the classifiers 120. The classifiers may be further analyzed to determine what features carry the largest prediction powers (e.g., similarity of speech rate, occurrence of first interrupt by customer, extrovert/introvert matching, or gender or age agreement.)

The classifier component 112 can generate multiple classifiers for the same outcome. However, for a given outcome, different classifiers have different features. For example, the classifier component 112 can generate a first classifier 305, "C1," and a second classifier 310, "C2," for a specified outcome, "O1." However, the first classifier "C1" has a first set of features, e.g., features "f1"-"f3," and the second classifier "C2" has a second set of features, e.g., features "f5"-"f8." The features in different classifiers can have different prediction powers and contribute to the specified outcome in different degrees.

Different classifiers may be built for a different number of participants, and may consider multiple participants as a single interlocutor, or as distinct entities. Further, as described above, the classifier component 112 can generate different classifiers for different time intervals of a conversation. The classifier component 112 analyzes the features 115 extracted from the feature generation component 111 at various time intervals, e.g., seconds 00:05-00:10, seconds 00:20-00:30, minutes 1:00-2:00, covering the entire conversation duration, and generates one or more classifiers for each of those time intervals. Each classifier can correspond to a specified time interval of the conversation. For example, if "100" conversations are being analyzed, then the classifier component 112 can analyze first 5-20 seconds each of the "100" conversations and generate one or more classifiers for all the conversations corresponding to the interval of 5-20 seconds. Similarly, it can generate one or more classifiers corresponding to the 10-25 seconds interval. If more than one classifier is generated for a specified time interval, in some embodiments, different classifiers can have different outcomes, and in some embodiments, can have the same outcome; however, different classifiers will have different sets of features that contribute to the corresponding outcome. In the example 300, classifiers C1 and C5 correspond to a time window of seconds 00:05-00:20 of the conversations analyzed, and classifier C10 corresponds to minute 1:00-2:00 of the conversations.

The classifier 315, "C3," includes an example set of features extracted from analyzing various sales calls. The classifier 315 corresponds to the first two minutes of the conversations, and indicates that when laughter from the customer is registered and the representative greets the customer, indulges in rapport building and poses at least two open-ended questions, then there is a high chance, e.g., 83%, of renewal of a magazine subscription. The features and outcome of the classifier 315 "C3" can be "f1→customer laughter=yes" "f2→greeting customer=yes," "f3→rapport building=yes," ("f4→open ended questions asked=yes," and "f5→number of open ended questions asked=2"), "outcome=renew subscription" "probability of outcome=83%."

Figure 4:
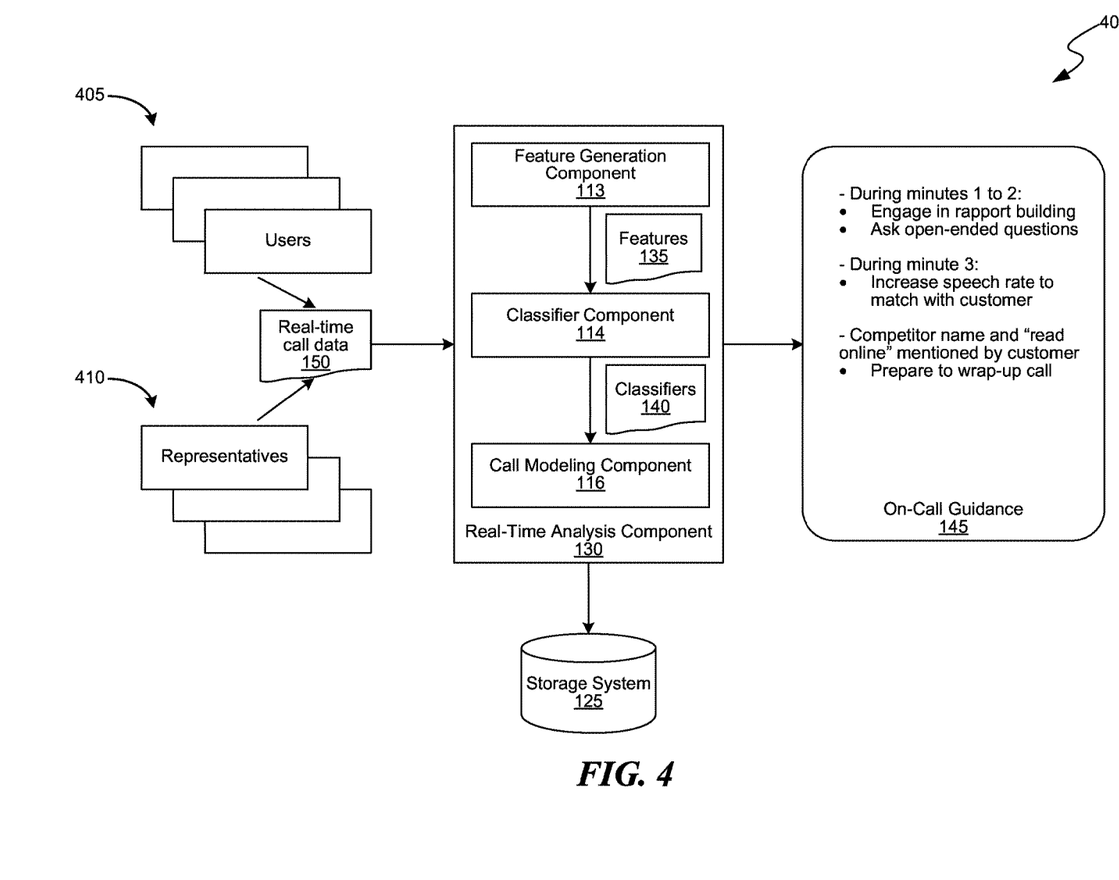
FIG. 4 is a block diagram of a real-time analysis component of the call-modeling system for generating on-call guidance for a representative during a call between the representative and a customer, consistent with various embodiments.

The classifiers 120 can be used by the real-time analysis component 130, e.g., as described at least with reference to FIG. 1 above and FIG. 4 below, to generate an on-call guidance for representatives or both inbound and outbound calls. FIG. 4 is a block diagram of the real-time analysis component of FIG. 1 for generating on-call guidance for a representative during a call between the representative and a customer, consistent with various embodiments. In some embodiments, the real-time analysis component 130 takes as input a live conversation stream, e.g., real-time call data 150, between a representative 410 and a customer 405, uses the feature generation component 113 to extract call features 135, e.g., as described above at least with reference to FIGS. 1 and 3.

The classifier component 114 feeds the call features 135 into the classifiers 120 generated by the offline analysis component 110 and selects a subset of the classifiers 120, e.g., a set of classifiers 140, that includes features that match with the call features 135 extracted from the live conversation stream. In some embodiments, the set of classifiers 140 chosen by the call-modeling component 116 are also the classifiers that have high predictability power, e.g., as measured using an F-score and that have an F-score exceeding a specified threshold.

The call-modeling component 116 then generates an on-call guidance 145, which includes information regarding real-time probabilities for specific outcomes to which the set of classifiers 140 correspond. The on-call guidance 145 may be used to notify the representative and/or their managers of the predicted outcome of the call. Additionally, the call-modeling component 116 can further analyze the set of classifiers 140 to determine classifiers that include features with the largest prediction powers, and present the values of those features in the on-call guidance 145 for suggesting the representative and/or their managers to modify or persist with an on-call behavior consistent with those features. For example, if one of the set of classifiers 140 predicts that conversations with rapport building and several open-ended questions being posed at the first few minutes of the conversation lead to favorable outcomes, the call-modeling component 116 may notify the representative and/or their managers as part of the on-call guidance 145 to engage in rapport building and pose questions at early stages of the conversation. Similarly, if one of the classifiers from the set of classifiers 140 indicates that matching speech rate to within 10% of customer's rate at a specified relative position of the call, e.g., during third minute of the call, leads to improved closing results, the call-modeling component 116 may notify the representative and/or their managers as part of the on-call guidance 145 to adjust their speech rate accordingly. On the other hand, if one of the classifiers from the set of classifiers 140 indicates that conversations beginning with over a specified number of objections, naming a specific competitor and mention of the phrase "read online" do not lead to good results, the call-modeling component 116 may notify the representative and/or their managers as part of the on-call guidance 145 to expedite wrap-up of conversations to avoid losing time on a call that is not likely to yield desired results.

In addition to live on-call guidance, the real-time analysis component 130 may be used to provide the representative and/or their managers with non-real time analysis as well, which provides insight into details of the conversations, e.g., what occurred in the conversations, when events occurred, and various such quantifiable analytics of the calls. For example, the classifiers can be used to find interesting calls that would interest the representatives to listen and learn from. The disclosed embodiments can be used to improve outcomes of the call not only during a real-time or a live call, but could also be used to inform representatives and/or managers for better training and coaching in retrospect.

The real-time analysis component 130 may also be used to auto-populate information fields in a customer relationship management (CRM) system or a similar system.

Figure 5:
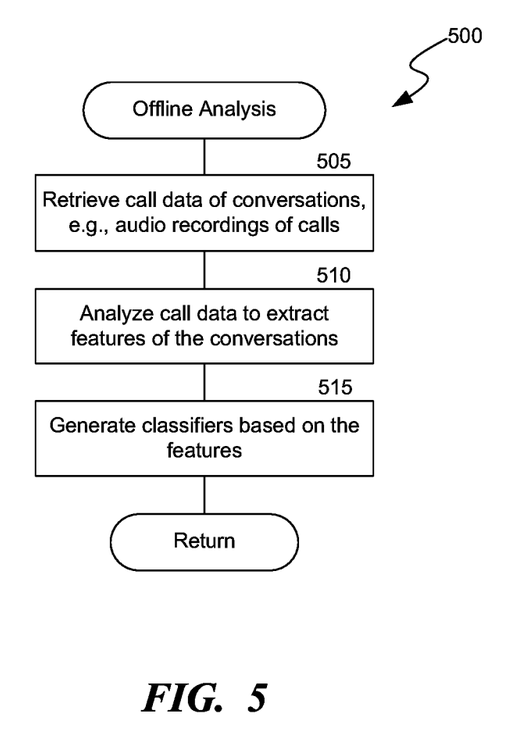
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call-modeling system 100 of FIG. 1. At block 505, the offline analysis component 110 retrieves historical call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, etc.) and personal attributes (e.g., age, accent, and gender). The feature generation component 111 can also analyze the call data 105 to generate various tags as described above.

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," NPS, or customer satisfaction. Each of the classifiers indicates a specific outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal. The classifier component 112 can generate multiple classifiers for the same outcome; however, they have distinct sets of features. Further, the classifier component 112 generates different classifiers for different time windows of the conversations. For example, the classifier component 112 generates a classifier "C1" for first two minutes of the conversations and a classifier "C2" for a third minute of the conversations. The offline analysis component 110 can store the features 115 and the classifiers 120 in a storage system 125.

Figure 6:
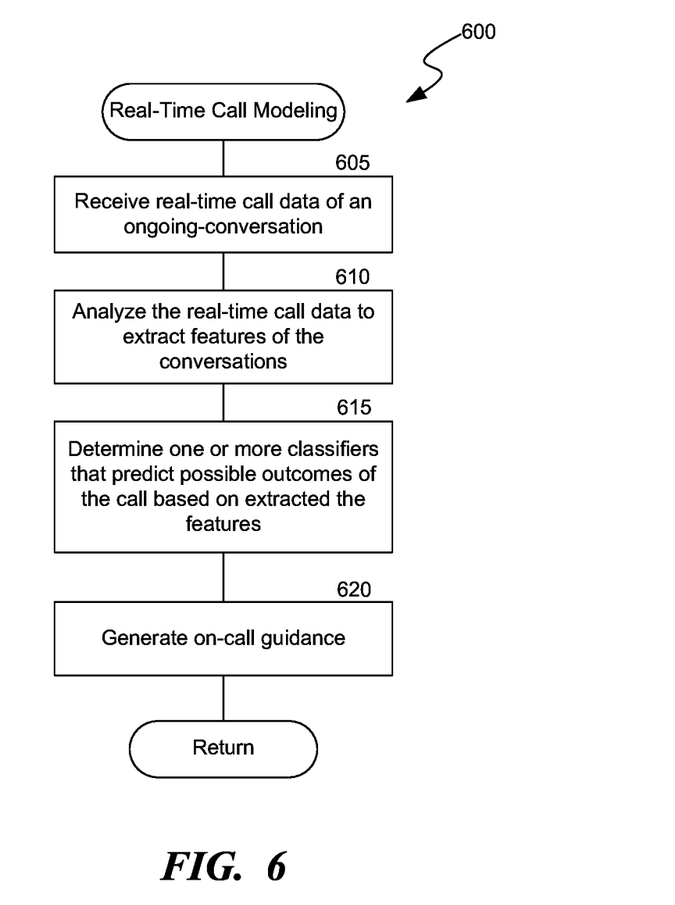
FIG. 6 is a flow diagram of a process for modeling calls between the participants to generate on-call guidance, consistent with various embodiments.

FIG. 6 is a flow diagram of a process 600 for modeling calls between participants to generate on-call guidance, consistent with various embodiments. In some embodiments, the process 600 can be implemented in the call-modeling system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2. The feature generation component 113 can also analyze the real-time call data 150 to generate various tags as described above.

At block 615, the classifier component 114 inputs the extracted features to classifiers in the storage system, e.g., classifiers 120 which are generated as described at least with reference to process 500 of FIG. 5, to determine one or more classifiers that predict possible outcomes of the call based on the extracted features. For example, as described at least with reference to FIGS. 1 and 4, the classifier component 114 feeds the extracted features 135 into the classifiers 120 generated by the offline analysis component 110, and selects a subset of the classifiers 120, e.g., a set of classifiers 140, that includes features that match with the call features 135 extracted from the live conversation stream. In some embodiments, the set of classifiers 140 include classifiers whose prediction power exceeds a specified threshold. The set of classifiers 140 corresponds to specific outcomes and include real-time probabilities for the specific outcomes.

At block 620, the call-modeling component 116 generates on-call guidance, e.g., on-call guidance 145, that presents the real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and then include those features and values associated with those features in the on-call guidance 145. The on-call guidance 145 notifies the representative to adopt or persist with an on-call behavior consistent with those features to achieve the desired outcome, or at least to increase the probability of achieving the desired outcome. For example, the on-call guidance 145 can present instructions on a display screen of a user device associated with the representative recommending the representative to change the rate of speech, use specific key words, or pose more open-ended questions to the customer in order to increase the probability of achieving the desired outcome.

Example Usage of the Embodiments

The following is an example usage of the disclosed embodiments for modeling sales calls for renewal of a subscription for a magazine. At a first stage, e.g., before a call is received from a live customer or before a call is placed by a representative, a number of recordings of previous calls is processed by the offline analysis component 110, e.g., using an ASR component 210 that is customized for the field of surgery institutions, an NLP component 225, an affect component 215 and a metadata component 220 to generate various features. The classifier component 112 generates two classifiers, based on those features, that can be found to be highly predictive: (a) a first classifier based on the first two minutes of one or more of the analyzed conversations, which indicates that when a laughter by the customer is registered, the representative engages in rapport building, and at least two open-ended questions are posed by the representative, then there is a high chance, e.g., 83%, of subscription renewal; (b) a second classifier based on the third minute of one or more of the analyzed conversations, which indicates that when a competitor magazine or the key-phrase "read online" is used, and/or the speech rate of the customer is more than three words per second, the renewal chances drop to 10%.

The above two classifiers can then be used by the real-time analysis component 130 in a second stage, e.g., during a live call between the representative and the customer, for generating an on-call guidance to guide the sales representatives as follows. Based on the first classifier, the real-time analysis component 130 can indicate to the sales representative to ask questions within the first 2 minutes. Based on the second classifier, the real-time analysis component 130 can, at minute three of the conversation, urge the representative to reduce speech rate to get the customer to mirror their own speech rate if a competitor is mentioned or otherwise the phrase "read online" is used. If the speech rate is not reduced, the real time analysis component 130 can indicate to the representative and/or their managers to wrap up the call as soon as possible.

The embodiments disclosed above may be implemented as separate modules, e.g., as presented above, as a single module, or any combination thereof. Implementation details may vary, including core machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
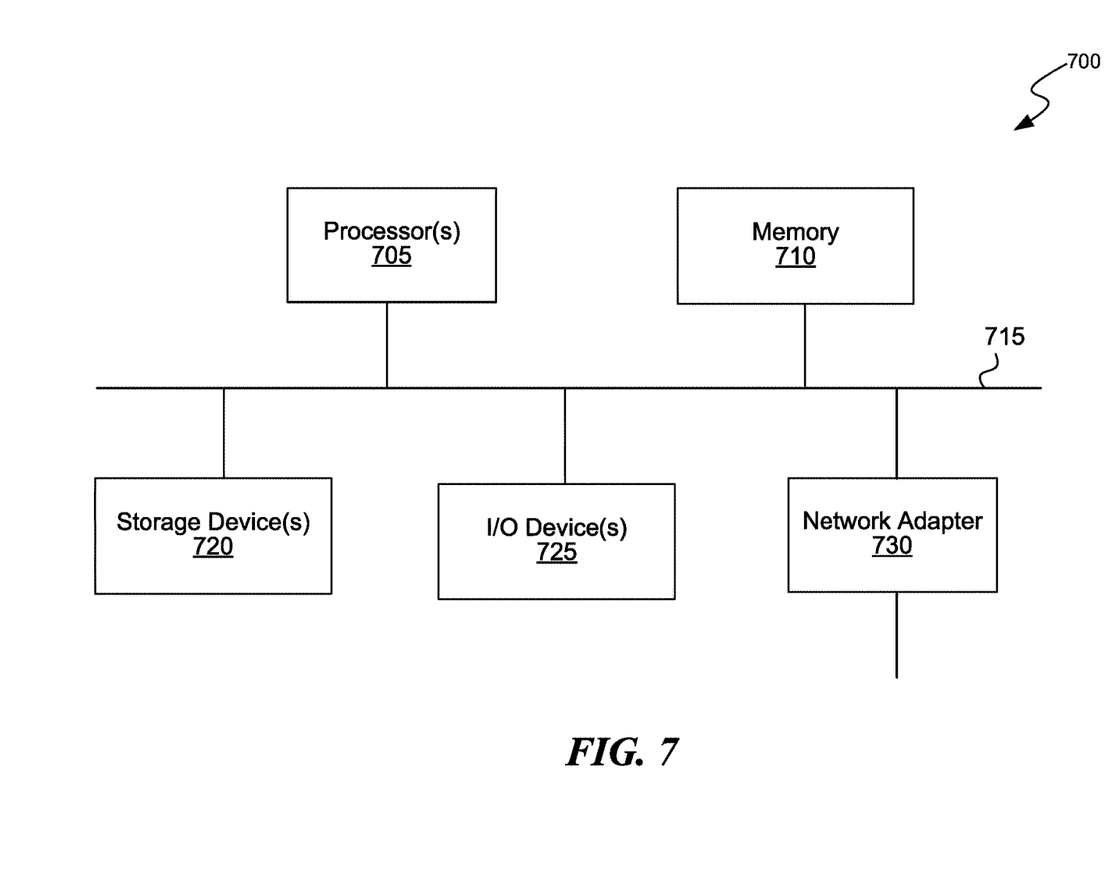
FIG. 7 is a block diagram of a processing system that can implement operations of the disclosed embodiments.

FIG. 7 is a block diagram of a computer system as may be used to implement features of the disclosed embodiments. The computing system 700 may be used to implement any of the entities, components or services depicted in the examples of the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method for modeling a conversation between a participant and a user, the computer-implemented method comprising:
    analyzing, by a computer system, a set of call data between multiple users and multiple participants to extract multiple features of conversations between the users and the participants, the multiple features indicating characteristics of any of (a) at least one of the users, (b) at least one of the participants, (c) the conversations;
    extracting, by the computer system, the multiple features of the conversations based on the analysis;
    generating, by the computer system, multiple classifiers based on the multiple features, wherein each of the multiple classifiers indicates one of multiple outcomes of a conversation of the conversations and includes a subset of the multiple features that contributed to the one of the multiple outcomes, wherein different classifiers have distinct features;
    receiving, by the computer system, real-time call data of an ongoing call between the user and the participant;
    extracting, by the computer system, a set of features from the real-time call data; and
    analyzing, by the computer system, the set of features using the multiple classifiers; and
    generating, by the computer system, probabilities for potential outcomes of the ongoing call based on the analyzing of the set of features.

2. The computer-implemented method of claim 1 further comprising:
    generating, by the computer system and based on the analyzing of the set of features, an on-call guidance which, when adopted by the participant, increases a probability of a specified outcome of the potential outcomes.

3. The computer-implemented method of claim 2, wherein generating the on-call guidance includes generating a notification that indicates the participant to adopt, desist, or persist with a conversation characteristic to increase or decrease the probability of the specified outcome.

4. The computer-implemented method of claim 3, wherein the conversation characteristic includes a feature that is determined using natural language processing.

5. The computer-implemented method of claim 3, wherein the conversation characteristic includes a user-participant pair feature.

6. The computer-implemented method of claim 2, wherein generating the on-call guidance includes:
    analyzing the set of features with a subset of the multiple classifiers that include features with a prediction power exceeding a specified threshold, and
    presenting values of the features as the on-call guidance.

7. The computer-implemented method of claim 1 further comprising:
    generating, by the computer system and based on the analyzing of the set of features, an on-call guidance which, when adopted, desisted or persisted by the participant, decreases the probability of a specified outcome of the potential outcomes.

8. The computer-implemented method of claim 1, wherein analyzing the set of call data includes analyzing audio recordings of conversations between the multiple users and the multiple participants.

9. The computer-implemented method of claim 1, wherein extracting the multiple features includes extracting the multiple features using an artificial intelligence or a machine learning technique.

10. The computer-implemented method of claim 1, wherein extracting the multiple features includes extracting the multiple features using natural language processing technique.

11. The computer-implemented method of claim 1, wherein generating the multiple classifiers includes generating the multiple classifiers using artificial intelligence or machine learning technique.

12. The computer-implemented method of claim 1, wherein generating the multiple classifiers includes:
    identifying features extracted at different temporal intervals or a relative position in a conversation of the set of call data, and
    generating, for each temporal interval or the relative position, one or more classifiers based on the features extracted at the corresponding temporal interval or the relative position.

13. The computer-implemented method of claim 12, wherein the relative position is a specified time in the conversation at which a specified characteristic occurred.

14. The computer-implemented method of claim 12, wherein the temporal intervals are fixed-length intervals.

15. The computer-implemented method of claim 1, wherein generating the multiple classifiers includes determining a prediction power of each of the multiple classifiers.

16. The computer-implemented method of claim 15, wherein the prediction power is indicated using an F-score, or a weighted F-score.

17. The computer-implemented method of claim 15, wherein determining the prediction power includes:
    generating the multiple classifiers based on analysis of a subset of the set of call data, and
    analyzing a remaining of the set of call data to using the multiple classifiers to generate the prediction power for each of the multiple classifiers.

18. The computer-implemented method of claim 1, wherein analyzing the set of features using the multiple classifiers include analyzing the set of features using a subset of the multiple classifiers having a prediction power exceeding a specified threshold.

19. The computer-implemented method of claim 1, wherein extracting the multiple features includes:
generating, by the computer system, features that include a transcription, vocabulary and a language model of the conversations as a first output.

20. The computer-implemented method of claim 19, wherein extracting the multiple features includes:
generating, by the computer system and using the first output, features that include semantic information from the conversations.

21. The computer-implemented method of claim 1, wherein extracting the multiple features includes:
generating, by the computer system, a set of low-level features that indicate information associated with voice signal in the set of call data, and a set of high level features that include personality traits and personal attributes of the multiple participants and emotion data that indicates emotions of the multiple participants.

22. The computer-implemented method of claim 1, wherein extracting the multiple features includes:
generating, by the computer system, features that include data regarding conversation flow.

23. The computer-implemented method of claim 1, wherein extracting the multiple features includes:
generating, by the computer system, user-participant pair related features.

24. The computer-implemented method of claim 1, wherein extracting the multiple features includes:
generating, by the computer system, features that indicate a blueprint of a conversation between a specified user and one of the multiple participants in the conversation.

25. The computer-implemented method of claim 1, wherein extracting the multiple features includes:
generating, by the computer system, a speaker engagement metric that includes information regarding a degree of engagement of a specified user in a conversation.

26. The computer-implemented method of claim 1, wherein extracting the set of features from the real-time call data includes:
automatically generating, by the computer system, multiple tags for the ongoing call, wherein each of the multiple tags indicates a key moment of the ongoing call.

27. The computer-implemented method of claim 26, wherein each of the multiple tags includes at least one of information regarding a moment to which the tag corresponds, a time interval at which the moment occurred in the ongoing call, a duration for which the moment lasted, or information regarding the participants of the ongoing call.

28. The computer-implemented method of claim 26 further comprising:
sharing, by the computer system, the multiple tags between the multiple participants during the ongoing call.

29. A non-transitory computer-readable storage medium storing computer-readable instructions, comprising:
instructions for receiving real-time call data of a call between a user and a participant of multiple participants;
instructions for extracting a set of features from the real-time call data, wherein the set of features includes characteristics of the user and characteristics associated with a conversation of the call;
instructions for analyzing the set of features using multiple classifiers, wherein the multiple classifiers are generated based on multiple features extracted from a set of historical call data, wherein each of the multiple classifiers indicates one of multiple outcomes of a conversation, includes a subset of the multiple features that contributed to the one of the multiple outcomes, and includes a probability value for the corresponding outcome; and
instructions for generating probabilities for potential outcomes of the call based on the analyzing of the set of features using the multiple classifiers.

30. The non-transitory computer-readable storage medium of claim 29 further comprising:
instructions for generating, based on the analyzing of the set of features, an on-call guidance which, when adopted or persisted by the participant, increases a probability of a specified outcome of the potential outcomes.

31. The non-transitory computer-readable storage medium of claim 29, wherein the instructions for analyzing the set of features using the multiple classifiers include:
instructions for generating the multiple classifiers, wherein at least one of the multiple features in each of the multiple classifiers indicates a characteristic of the multiple participants that influenced an outcome of conversations indicated by the corresponding classifier.

32. The non-transitory computer-readable storage medium of claim 29, wherein the instructions for analyzing the set of features using the multiple classifiers include:
instructions for identifying features extracted at different temporal intervals or a relative position in a conversation of the set of call data, and
instructions for generating, for each temporal interval or the relative position, one or more classifiers based on the features extracted at the corresponding temporal interval or the relative position.

33. The non-transitory computer-readable storage medium of claim 29, wherein analyzing the set of features using the multiple classifiers include instructions for analyzing the set of features using a subset of the multiple classifiers having a prediction power exceeding a specified threshold.

34. The non-transitory computer-readable storage medium of claim 29, wherein the instructions for generating the multiple classifiers include:
instructions for generating different classifiers for different participants.

35. The non-transitory computer-readable storage medium of claim 29, wherein the instructions for generating the multiple classifiers include:
instructions for generating different classifiers for the same outcome, wherein the different classifiers have distinct features, and wherein a probability value of the outcome is based on a specified set of features in a specified classifier of the different classifiers.

36. A system comprising:
a first component that is configured to receive real-time call data of a call between the user and a participant of multiple participants;
a second component that is configured to extract a set of features from real-time call data, wherein the set of features includes characteristics of the user and characteristics associated with a conversation of the call;

a third component that is configured to analyze the set of features using multiple classifiers, wherein the multiple classifiers are generated based on multiple features extracted from a set of historical call data, wherein each of the multiple classifiers indicates one of multiple outcomes of a conversation, includes a subset of the multiple features that contributed to the one of the multiple outcomes, and includes a probability value for the corresponding outcome; and a fourth component that is configured to generate probabilities for potential outcomes of the call based on the analyzing of the set of features using the multiple classifiers.

37. The system of claim 36 further comprising:

a fifth component that is configured to generate, based on the analyzing of the set of features, an on-call guidance which, when adopted, desisted, or persisted by the participant, increases a probability of a specified outcome of the potential outcomes.

38. A system for modeling calls between multiple representatives and multiple customers in real-time, comprising:

a first component that is configured to receive audio recordings and/or call streams of conversations between the representatives and the customers;

a second component that is configured to extract features from the audio recordings and/or the call streams;

a third component that is configured to generate multiple classifiers based on the extracted features for different temporal intervals, the classifiers including probabilities for possible outcomes of a conversation of the conversations; and a fourth component that is configured to apply, in real-time, the classifiers to a conversation in progress between a customer of the customers and a representative of the representatives to generate instructions for the representative for improving an outcome of the conversation, wherein the instructions include one or more features and values of those features that, when adopted by the representative, increases the probability of the outcome.

39. The system of claim 38, wherein the second component is configured to extract the features using an automatic speech recognition component, a natural language processing component, an affect component and a meta-data component.

40. The system of claim 38, wherein the third component is configured to generate the multiple classifiers by apply deep learning techniques with hidden layers of the extracted features.

41. The system of claim 38, wherein the third component is configured to generate the multiple classifiers by processing the conversations using a machine learning algorithm.

* * * * *